(12) United States Patent
Suzuki et al.

(10) Patent No.: US 7,582,041 B2
(45) Date of Patent: Sep. 1, 2009

(54) CONTROLLER FOR CONTINUOUSLY VARIABLE TRANSMISSION

(75) Inventors: Yuji Suzuki, Kariya Aichi (JP); Takashi Ohta, Chikushino Fukuoka (JP); Yosuke Hanai, Tokyo (JP); Hiroshi Izumi, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 649 days.

(21) Appl. No.: 11/402,805

(22) Filed: Apr. 13, 2006

(65) Prior Publication Data

US 2006/0235596 A1 Oct. 19, 2006

(30) Foreign Application Priority Data

Apr. 14, 2005 (JP) ............................. 2005-117065

(51) Int. Cl.
*B60K 31/00* (2006.01)
*F16H 9/00* (2006.01)

(52) U.S. Cl. ...................................... 477/42
(58) Field of Classification Search .................... 477/42
See application file for complete search history.

(56) References Cited

U.S. PATENT DOCUMENTS 5,217,086 A * 6/1993 Morimoto ................... 180/177
6,311,118 B1 * 10/2001 Ito et al. ...................... 701/95
6,364,808 B1 * 4/2002 Saur ............................ 477/42
6,389,348 B1 * 5/2002 Takagi et al. ................. 701/58
6,513,610 B2 * 2/2003 Ochiai et al. ................ 180/176
2003/0176256 A1 * 9/2003 Kamichi et al. ............... 477/5

FOREIGN PATENT DOCUMENTS

JP          02085559    *  3/1990
JP        11-314536 A    11/1999

* cited by examiner

*Primary Examiner*—Sherry Estremsky
(74) *Attorney, Agent, or Firm*—Birch, Stewart, Kolasch & Birch, LLP

(57) ABSTRACT

A controller for a continuously variable transmission (CVT) mounted in a vehicle. The controller includes a first setting unit for setting a basic speed ratio of the CVT; a second setting unit for setting an adjustment speed ratio of the CVT; and a control unit for controlling the CVT based on the basic speed ratio and adjustment speed ratio. The second setting unit includes an increasing unit for progressively increasing the adjustment speed ratio according to a increase in a target torque interrelated value in a first operating area, and a decreasing unit for progressively decreasing the adjustment speed ratio according to a decrease in the target torque interrelated value in a second operating area. Between the first operating area and the second operating area, the second setting unit maintains the adjustment speed ratio that is set finally.

16 Claims, 6 Drawing Sheets

CONTROLLER FOR CONTINUOUSLY VARIABLE TRANSMISSION

CROSS-REFERENCE TO THE RELATED APPLICATION

This application incorporates by references the subject matter of Application No. 2005-117065 filed in Japan on Apr. 14, 2005 on which a priority claim is based under 35 U.S.C. § 119(a).

BACKGROUND OF THE INVENTION (1) Field of the Invention

The present invention relates to a controller for a continuously variable transmission that is particularly suitable for use in vehicles.

(2) Description of the Related Art

Vehicles with a continuously variable transmission (CVT) have hitherto been put to practical use and are able to enhance fuel consumption while preventing a shock that is caused in changing vehicle speed.

The continuously variable transmission is designed so that stepless speed ratios are obtained. The speed ratios, as shown in FIG. 6, are produced based on a basic speed ratio $R_{B100}$ previously set according to a vehicle speed Vs. If the accelerator pedal is depressed, the basic speed ratio $R_{B100}$ is shifted (see dashed lines) Note that in the case of gasoline engines, throttle opening may be used instead of accelerator pedal position.

When the vehicle speed Vs is being held constant, there are cases where engine output control (e.g., control of throttle opening) interferes with speed ratio control relative to the CVT. The interference between them will be explained in detail in the following example. In this concrete example, it is assumed that engine output is controlled by a cruise control system. The continuously variable transmission is controlled by a CVT controller. The engine is a gasoline engine with an electronically controlled throttle valve.

For instance, the driver sets a target speed to a speed of 60 km/h. In this case, when the vehicle is traveling on a level road at a constant speed, the cruise control system controls the throttle valve so that it is opened according to the target speed.

Thereafter, if the vehicle begins to go up a slope, the vehicle speed will be reduced. Because of this, the cruise control system opens the throttle valve wider in order to maintain a speed of 60 km/h.

As a result, the vehicle speed reaches a speed of 60 km/h, but since the throttle valve is opened wider, the CVT controller controls the continuously variable transmission so that the speed ratio becomes higher (see a dashed arrow in FIG. 6). Because of this, the driving torque will increase and therefore the vehicle speed will exceed a speed of 60 km/h.

Therefore, the cruise control system reduces the throttle opening to maintain a speed of 60 km/h which is the target vehicle speed. The reduction in the throttle opening then causes the CVT controller to control the continuously variable transmission so that the speed ratio becomes lower. As a result, the driving torque will be reduced and the vehicle speed cannot maintain a speed of 60 km/h.

Japanese Laid-Open Patent Publication No. hei 11-314536 discloses a technique for preventing the engine output control from interfering with the speed ratio control relative to the CVT during travel at a constant speed.

The technique shown in the aforementioned Japanese Laid-Open Patent Publication, however, requires mathematical modeling of a vehicle and a control program therefor, which are fairly difficult and time-consuming. Moreover, fine adjustments to them involve considerable time, labor, and costs.

SUMMARY OF THE INVENTION

The present invention has been made in view of the circumstances described above. Accordingly, it is the primary object of the present invention to provide a structurally simpler controller for a continuously variable transmission which is capable of preventing the engine output control from interfering with the speed ratio control relative to the CVT during travel at a constant speed.

To achieve this end, there is provided a controller for a continuously variable transmission mounted in a vehicle which has an engine and a cruise control system for maintaining a target vehicle speed. The controller comprises three major components: (1) basic speed ratio setting means for setting a basic speed ratio of the continuously variable transmission based on the target vehicle speed; (2) adjustment speed ratio setting means for sequentially setting an adjustment speed ratio of the continuously variable transmission based on a target torque interrelated value which is a value interrelated with a target torque of the engine; and (3) speed ratio control means for controlling the continuously variable transmission so that an actual speed ratio of the continuously variable transmission becomes equal to a target speed ratio obtained by adding the adjustment speed ratio set by the adjustment speed ratio setting means to the basic speed ratio set by the basic speed ratio setting means. The aforementioned adjustment speed ratio setting means includes (1) adjustment speed ratio increasing means for progressively increasing the adjustment speed ratio according to an increase in the target torque interrelated value only when the target torque interrelated value is increased and when an operating point determined by the target torque interrelated value and adjustment speed ratio is present on a first operating area; and (2) adjustment speed ratio decreasing means for progressively decreasing the adjustment speed ratio according to a decrease in the target torque interrelated value only when the target torque interrelated value is decreased and when the operating point is present on a second operating area. When the operating point is present within a third operating area between the first operating area and the second operating area, the adjustment speed ratio setting means maintains the adjustment speed ratio that is set finally.

Thus, with a simpler construction, the engine output control can be prevented from interfering with the speed ratio control relative to the CVT during travel at a constant speed.

BRIEF DESCRIPTION OF THE DRAWINGS

The nature of this invention, as well as other objects and advantages thereof, will be explained in the following with reference to the accompanying drawings, in which like reference numerals and characters designate the same or similar parts throughout the figures and wherein.

DESCRIPTION OF THE PREFERRED EMBODIMENTS

Figure 1:
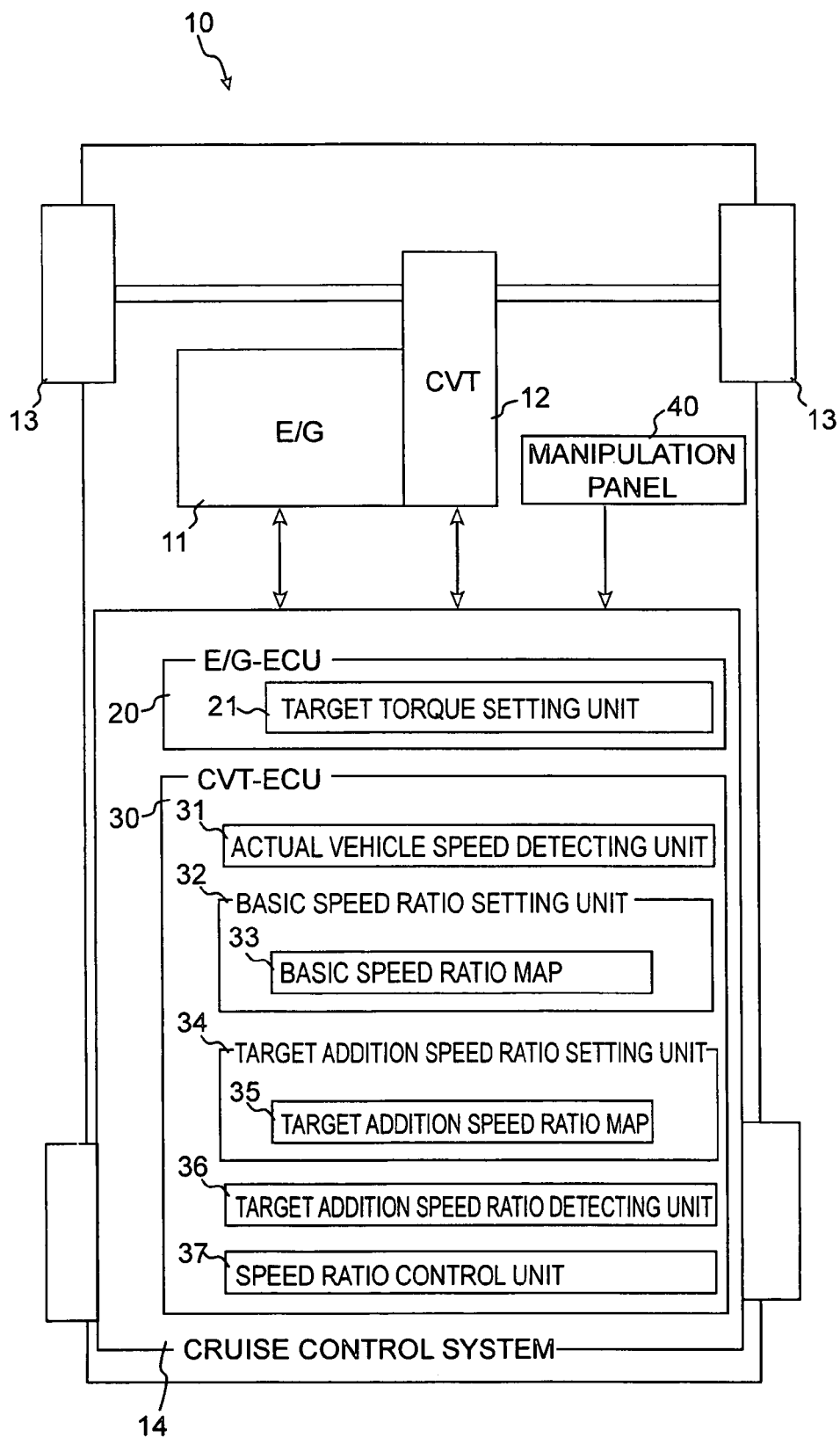
FIG. 1 is a block diagram showing a controller for a continuously variable transmission constructed in accordance with a preferred embodiment of the present invention.

Referring to FIG. 1, there is shown a controller for a continuously variable transmission constructed in accordance with a preferred embodiment of the present invention. As shown in the figure, a vehicle 10 includes a gasoline engine (hereinafter referred to simply as an engine (E/G)) 11 and a continuously variable transmission (CVT) 12 by which torque output from the engine 11 is transmitted to driving wheels 13. The engine 11 is equipped with an electronically controlled throttle valve (not shown), its throttle opening being controlled by an engine electronic control unit (E/G-ECU) 20 to be described later.

The vehicle 10 further includes a cruise control system 14 that can be switched on to maintain a target vehicle speed $V_{S-T}$ without the use of the accelerator pedal. The cruise control system 14 is connected with the engine 11 and CVT 12 and is mainly equipped with the E/G-ECU 20 and a CVT electronic control unit (CVT-ECU) 30.

The cruise control system 14 is further connected with a manipulation panel (target vehicle speed setting means) 40, through which the driver's demands are input to the system 14.

Among these components, the E/G-ECU 20 is an electronic control unit equipped with interfaces, memory devices, a central processing unit, etc., and includes a target torque setting unit (target torque setting means) 21. Based on a difference between the target vehicle speed $V_{S-T}$ and an actual vehicle speed $V_{S-A}$, the target torque setting unit 21 calculates a target torque $T_{Q-T}$ so that the vehicle 10 can travel at the target vehicle speed $V_{S-T}$. This target torque setting unit 21 is realized as software.

The target vehicle speed $V_{S-T}$ can be input by the driver via the manipulation panel 40 mounted in a steering wheel (not shown). An actual vehicle speed $V_{S-A}$ is detected by an actual vehicle speed detecting unit 31 that is to be described later.

The target torque setting unit 21 calculates a target throttle opening $\theta_{TH-T}$ (which is a value interrelated with a target torque) for obtaining the calculated target torque $T_{Q-T}$, and controls the electronically controlled throttle valve (not shown) of the engine 11 so that the throttle opening of the throttle valve becomes the target throttle opening $\theta_{TH-T}$.

The CVT-ECU 30, as with the E/G-ECU 20, is an electronic control unit equipped with interfaces, memory devices, a central processing unit, etc., and controls the continuously variable transmission 12 to obtain stepless speed ratios. The CVT-ECU 30 includes an actual vehicle speed detecting unit 31, a basic speed ratio setting unit 32, a target addition speed ratio setting unit 34, an actual addition speed ratio setting unit 36, and a speed ratio control unit 37, these units being realized as software.

Among these units, the actual vehicle speed detecting unit 31 calculates an actual vehicle speed $V_{S-A}$ of the vehicle 10 based on a detection signal from a vehicle speed sensor (not shown).

Figure 2:
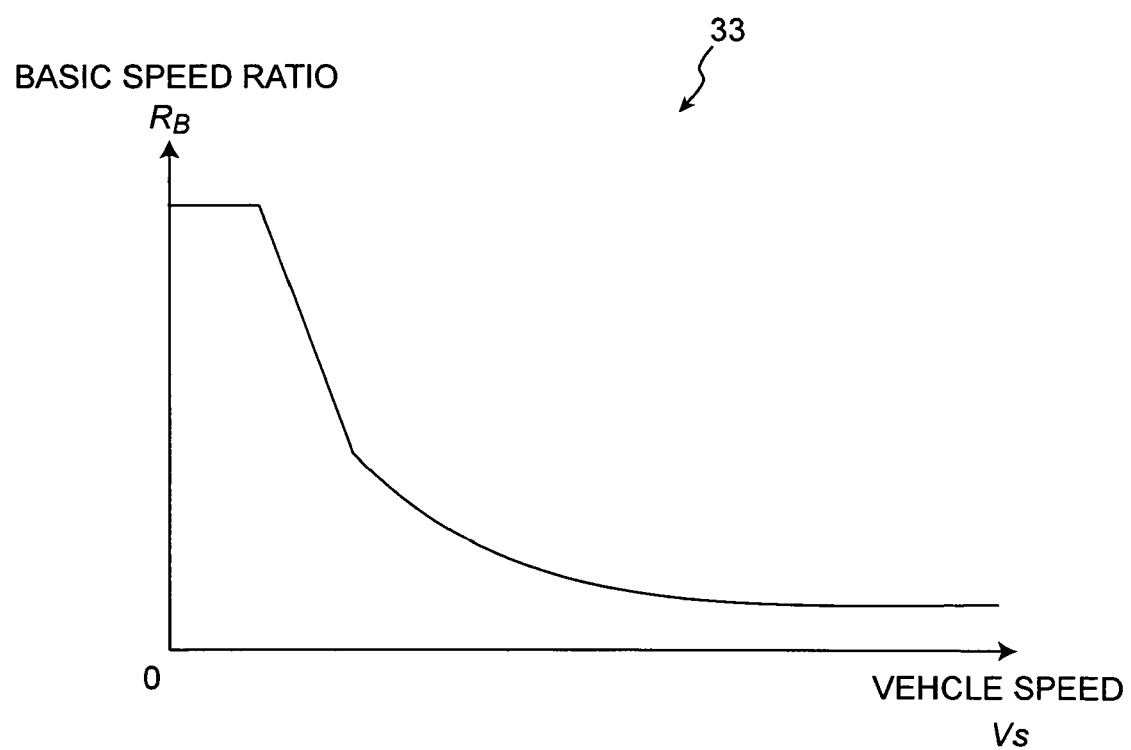
FIG. 2 is a schematic diagram showing a basic speed ratio map employed in the controller.

The basic speed ratio setting unit (basic speed ratio setting means) 32 sets the basic speed ratio $R_B$ of the continuously variable transmission 12 based on the target vehicle speed $V_{S-T}$ input via the manipulation panel 40 by the driver. This basic speed ratio $R_B$ is obtained according to a basic speed ratio map 33 (see FIG. 2) incorporated in the basic speed ratio setting unit 32.

The target addition speed ratio setting unit 34 sets a target addition speed ratio $R_{A-T}$, based on an operating point that is determined by a target throttle opening $\theta_{TH-T}$ set by the target torque setting unit 21 of the E/G-ECU 20 and an actual addition speed ratio (actual adjustment speed ratio) $R_{A-A}$ detected by the actual addition speed ratio setting unit 36 (described later). More specifically, the target addition speed ratio $R_{A-T}$ is obtained according to a target addition speed ratio map 35 (adjustment speed ratio map (FIG. 3)) incorporated in the target addition speed ratio setting unit 34. The setting of the target addition speed ratio $R_{A-T}$ by the target addition speed ratio setting unit 34 is sequentially executed at extremely short intervals. The target addition speed ratio map 35 combines two functions; it acts both as adjustment speed ratio increasing means and as adjustment speed ratio decreasing means.

Figure 5:
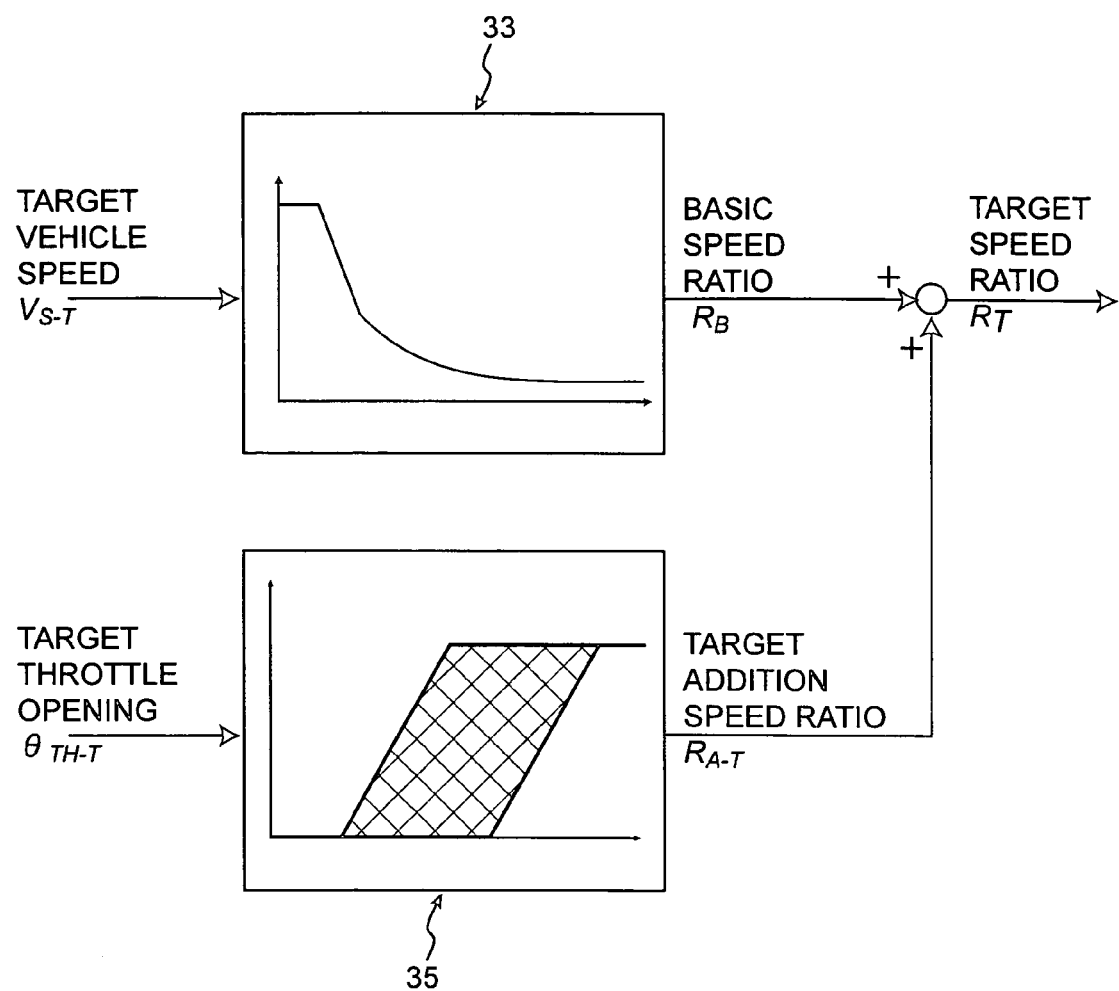
FIG. 5 is a block diagram showing how a target speed ratio is obtained by the controller.
Figure 6:
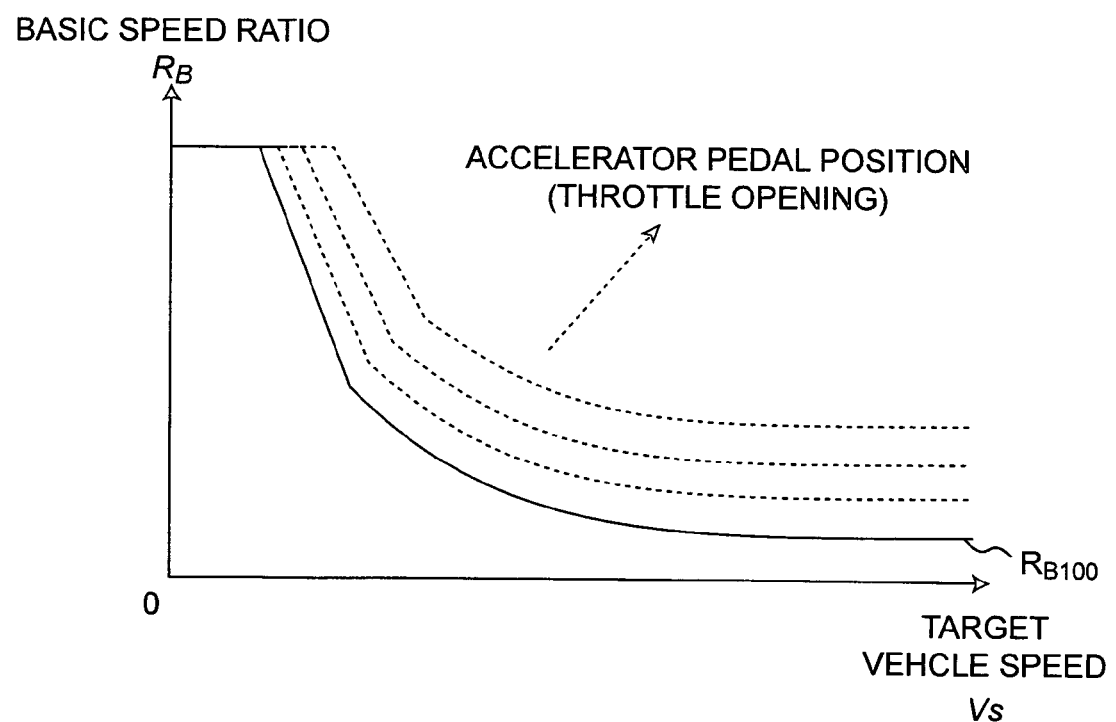
FIG. 6 is a schematic diagram showing how basic speed ratios are obtained by a conventional controller for a continuously variable transmission.

As shown in FIG. 5, the target addition speed ratio (adjustment speed ratio) $R_{A-T}$ is added to the basic speed ratio $R_B$ obtained by the basic speed ratio setting means 32. The addition of the target addition speed ratio $R_{A-T}$ to the basic speed ratio $R_B$ obtains a speed ratio (target speed ratio) $R_T$ of the continuously variable transmission 12.

That is, in the preferred embodiment, the basic speed ratio $R_B$ is constant, whereas the target addition speed ratio $R_{A-T}$ varies with the target throttle opening $\theta_{TH-T}$. By adding the target addition speed ratio $R_{A-T}$ to the basic speed ratio $R_B$, the target speed ratio $R_T$ is set. Note the setting of the target speed ratio $R_T$ is performed by the speed ratio control unit 37 to be described later.

Figure 3:
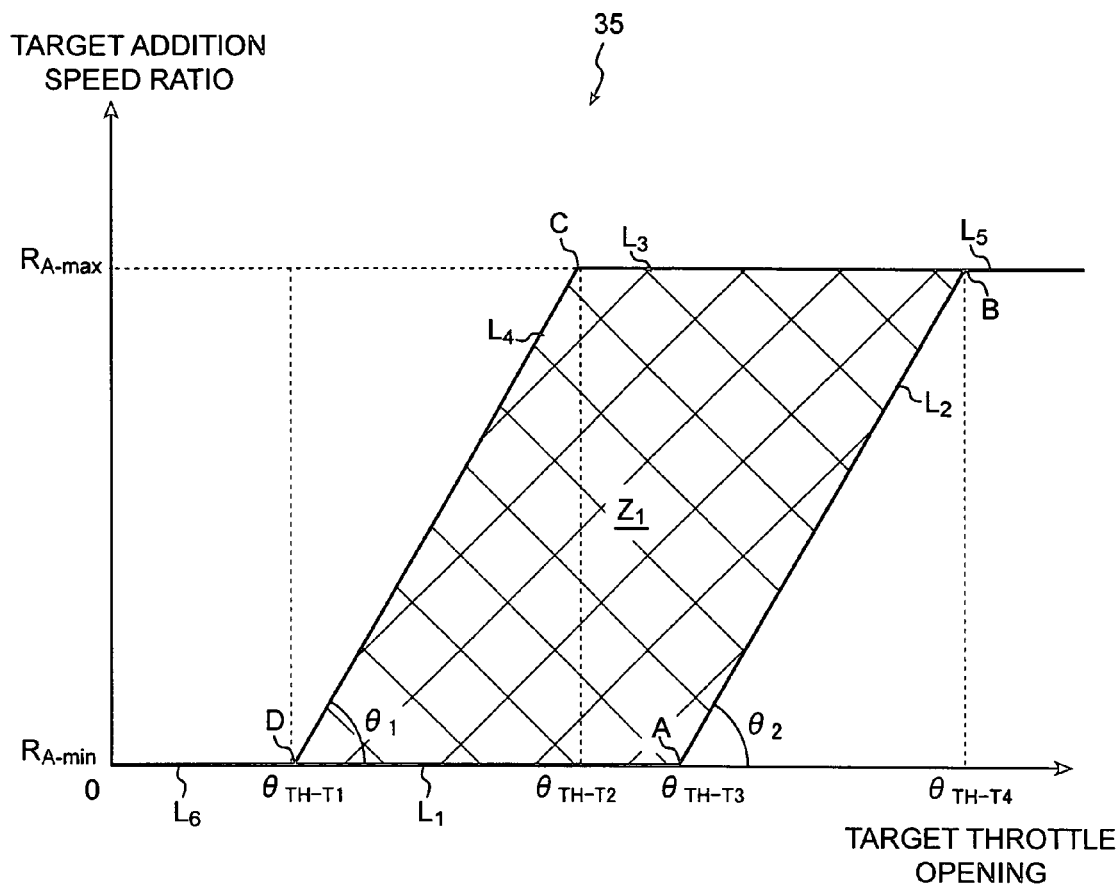
FIG. 3 is a schematic diagram showing an addition speed ratio map employed in the controller.

As shown in FIG. 3, the target addition speed ratio map 35 has a minimum target addition speed ratio (minimum value) $R_{A-min}$ and a maximum target addition speed ratio (maximum value) $R_{A-Max}$. The minimum speed ratio $R_{A-min}$ and maximum speed ratio $R_{A-max}$ satisfy the following Eq. (1):

$$R_{A-min} < R_{A-max} \tag{1}$$

The target addition speed ratio map 35 further has a first target throttle opening $\theta_{TH-T1}$, a second target throttle opening $\theta_{TH-T2}$, a third target throttle opening $\theta_{TH-T3}$, and a fourth target throttle opening $\theta_{TH-T4}$, which are the threshold values of the target throttle opening $\theta_{TH-T}$. These are set so as to satisfy the following Eq. (2):

$$\theta_{TH-T1} < \theta_{TH-T2} < \theta_{TH-T3} < \theta_{TH-T4} \tag{2}$$

The target addition speed ratio map 35 further has a speed ratio decreasing line (adjustment speed ratio decreasing means) $L_4$, a speed ratio increasing line (adjustment speed ratio increasing means) $L_2$, a maximum clipping line $L_5$, and a minimum clipping line $L_6$.

Among these lines, the speed ratio decreasing line (adjustment speed ratio decreasing line) $L_4$ is a line linking points C and D shown in FIG. 3, that is, a straight line linking the second target throttle opening $\theta_{TH-T2}$ at the maximum speed ratio $R_{A-max}$ with the first target throttle opening $\theta_{TH-T2}$ at the minimum speed ratio $R_{A-min}$. The speed ratio decreasing line $L_4$ is inclined at an angle $\theta_1$ to the horizontal axis (axis of the target throttle opening $\theta_{TH-T}$).

Figure 4:
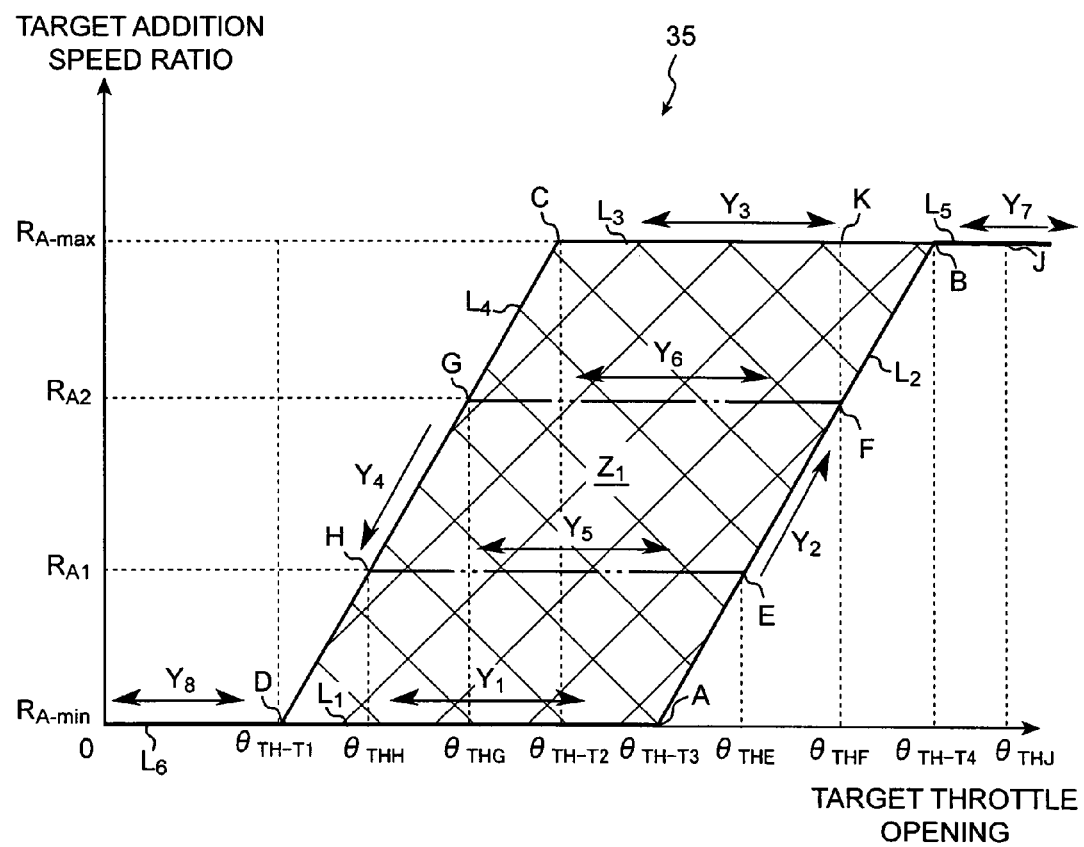
FIG. 4 is a schematic diagram showing how target addition speed ratios are obtained according to the addition speed ratio map employed in the controller.

Only in the case where the target throttle opening $\theta_{TH-T}$ is decreased under the speed ratio decreasing line $L_4$, as shown by a narrow $Y_4$ in FIG. 4, the target addition speed ratio $R_{A-T}$ is set along the speed ratio decreasing line $L_4$. Therefore, if the target throttle opening $\theta_{TH-T}$ is increased over the speed ratio decreasing line $L_4$, the line $L_4$ has no influence on calculation of the target addition speed ratio $R_{A-T}$. Note that the speed ratio decreasing line $L_4$ has a second operating area thereon.

The speed ratio increasing line (adjustment speed ratio increasing line) $L_2$ is a line linking points B and A shown in FIG. 3, that is, a straight line linking the fourth target throttle opening $\theta_{TH-T4}$ at the maximum speed ratio $R_{A-max}$ with the third target throttle opening $\theta_{TH-T3}$ at the minimum speed ratio $R_{A-min}$. The speed ratio increasing line $L_2$ is inclined at an angle $\theta_2$ to the horizontal axis (axis of the target throttle opening $\theta_{TH-T}$).

In this embodiment, the angle $\theta_1$ of the speed ratio decreasing line $L_4$ to the axis of the target throttle opening $\theta_{TH-T}$ is equal to the angle $\theta_2$ of the speed ratio increasing line $L_2$. In other words, the speed ratio decreasing line $L_4$ is set parallel to the speed ratio increasing line $L_2$.

Only in the case where the target throttle opening $\theta_{TH-T}$ is increased over the speed ratio increasing line $L_4$, as shown by a narrow $Y_2$ in FIG. 4, the target addition speed ratio $R_{A-T}$ is set along the speed ratio increasing line $L_2$. Therefore, if the target throttle opening $\theta_{TH-T}$ is decreased under the speed ratio increasing line $L_2$, the line $L_2$ has no influence on calculation of the target addition speed ratio $R_{A-T}$. Note that the speed ratio increasing line $L_2$ has a first operating area thereon.

The maximum clipping line $L_5$ is a straight line extending from the fourth target throttle opening $\theta_{TH-T4}$ (point B) in the direction of increasing the target throttle opening $\theta_{TH-T}$ along the maximum speed ratio $R_{A-max}$. If the target throttle opening $\theta_{TH-T}$ exceeds the fourth target throttle opening $\theta_{TH-T4}$, the target addition speed ratio $R_{A-T}$ is clipped at the maximum speed ratio $R_{A-max}$.

The minimum clipping line $L_6$ is a straight line linking the origin with the first target throttle opening $\theta_{TH-T1}$ (point D). If the target throttle opening $\theta_{TH-T}$ is decreased under the first target throttle opening $\theta_{TH-T1}$, the target addition speed ratio $R_{A-T}$ is clipped at the minimum speed ratio $RA_{A-min}$.

The target addition speed ratio map 35 further has a third operating area $Z_1$, which is defined by (1) a minimum speed ratio line $L_1$ linking the first throttle opening $\theta_{TH-T}$ (point D) at the minimum speed ratio $R_{A-min}$ with the third throttle opening $\theta_{TH-T3}$ (point A) at the minimum speed ratio $R_{A-min}$, (2) a maximum speed ratio line $L_3$ linking the second throttle opening $\theta_{TH-T2}$ (point C) at the maximum speed ratio $R_{A-max}$ with the fourth throttle opening $\theta_{TH-T4}$ (point B) at the maximum speed ratio $R_{A-max}$, (3) a speed ratio decreasing line $L_4$ linking the first throttle opening $\theta_{TH-T1}$ (point D) at the minimum speed ratio $R_{A-min}$ with the second throttle opening $\theta_{TH-T2}$ (point C) at the maximum speed ratio $R_{A-max}$, and (4) a speed ratio increasing line $L_2$ linking the third throttle opening $\theta_{TH-T3}$ (point A) at the minimum speed ratio $R_{A-min}$ with the fourth throttle opening $\theta_{TH-T4}$ (point B) at the maximum speed ratio $R_{A-max}$.

In the third operating area $Z_1$, regardless of the magnitude of the target throttle opening $\theta_{TH-T}$, an actual addition speed ratio (actual adjustment speed ratio) $R_{A-A}$ maintains the target addition speed ratio $R_{A-T}$ that was set last time.

The actual addition speed ratio detecting unit 36 is used to detect an actual addition speed ratio $R_{A-A}$ which is the current target addition speed ratio. More specifically, the detecting unit 36 regards as an actual addition speed ratio $R_{A-A}$ the target addition speed ratio $R_{A-T}$ set last time by the addition speed ratio setting unit 34 that sequentially calculates a target addition speed ratio $R_{A-T}$ at extremely short intervals.

The speed ratio control unit (speed ratio control means) 37, as shown in FIG. 5, adds a target addition speed ratio $R_{A-T}$ set by the target addition speed ratio setting unit 34 to a basic speed ratio $R_B$ set by the basic speed ratio setting unit 32, thereby obtaining a target speed ratio $R_T$. The speed ratio control unit 37 controls the CVT 12 so that the speed ratio of the CVT 12 becomes equal to the target speed ratio $R_T$ obtained in the aforementioned manner.

Since the CVT controller of the preferred embodiment is constructed as described above, it possesses the following operation and advantages. A description will be given in the case where the target throttle opening $\theta_{TH-T}$ varies as shown by $\theta_{THE}$, $\theta_{THF}$, $\theta_{THG}$, $\theta_{THH}$, $\theta_{THJ}$, and $\theta_{THK}$ in FIG. 4.

Initially, consider the case where since the target addition speed ratio setting unit 34 has not calculated a target addition speed ratio $R_{A-T}$ yet, the target addition speed ratio (i.e., actual addition speed ratio) $R_{A-A}$ obtained last time is zero, and where the target throttle opening $\theta_{TH-T}$ increases progressively from zero to $\theta_{THE}$. In this case, until the target throttle opening $\theta_{TH-T}$ increases from zero to the first target opening $\theta_{TH-T1}$, the target addition speed ratio $R_{A-T}$ remains zero.

Thereafter, until the target throttle opening $\theta_{TH-T}$ increases from the first target opening $\theta_{TH-T1}$ to the third target opening $\theta_{TH-T3}$, the target addition speed ratio $R_{A-T}$ remains at the actual addition speed ratio $R_{A-A}$. That is, it is maintained at the minimum speed ratio $R_{A-min}$.

Thereafter, until the target throttle opening $\theta_{TH-T}$ increases to $\theta_{THE}$, the target addition speed ratio $R_{A-T}$ increases progressively along the speed ratio increasing line $L_2$ from the minimum speed ratio $R_{A-min}$ to a value indicated at $R_{A1}$ (see the speed ratio increasing line $L_2$ between points A and E and arrow $Y_2$).

Next, consider the case where the target throttle opening $\theta_{TH-T}$ is reduced to zero, from the state in which the actual addition speed ratio $R_{A-A}$ is $R_{A1}$ and the target throttle opening $\theta_{TH-T}$ is $\theta_{THE}$ (point E in FIG. 4). In this case, until the target throttle opening $\theta_{TH-T}$ reaches the speed ratio decreasing line $L_4$, the target addition speed ratio $R_{A-T}$ is maintained at a predetermined actual addition speed ratio $(R_{A1})$ (see an arrow $Y_5$). After the target throttle opening $\theta_{TH-T}$ reaches the speed ratio decreasing line $L_4$ (see point H), the target addition speed ratio $R_{A-T}$ is progressively decreased along the speed ratio decreasing line $L_4$ (see the speed ratio decreasing line $L_4$ between points H and D and arrow $Y_4$). Thereafter, if the target throttle opening $\theta_{TH-T}$ reaches $\theta_{TH-T1}$, the target addition speed ratio $R_{A-T}$ becomes the minimum speed ratio $R_{A-min}$ (see point D). If the target throttle opening $\theta_{TH-T}$ is further reduced, the target addition speed ratio $R_{A-T}$ is clipped at the minimum speed ratio $R_{A-min}$ (see the minimum clipping line $L_6$).

Next, consider the case where the target throttle opening $\theta_{TH-T}$ is progressively increased to $\theta_{THF}$, from the state in which the actual addition speed ratio $R_{A-A}$ is $R_{A1}$ and the target throttle opening $\theta_{TH-T}$ is $\theta_{THH}$ (see point H in FIG. 4).

In this case, regardless of an increase in the target throttle opening $\theta_{TH-T}$, the target addition speed ratio $R_{A-T}$ remains at $R_{A1}$ without being increased from point H along the speed ratio decreasing line $L_4$. This is because, only when the target throttle opening $\theta_{TH-T}$ is decreased under the speed ratio decreasing line $L_4$, the target addition speed ratio $R_{A-T}$ is set along the speed ratio decreasing line $L_4$ (see an arrow $Y_4$). Therefore, when the target throttle opening $\theta_{TH-T}$ is increased over the speed ratio decreasing line $L_4$, the line $L_4$ has no influence on calculation of the target addition speed ratio $R_{A-T}$.

Because of this, as indicated by an arrow $Y_5$, the target addition speed ratio $R_{A-T}$ remains at $R_{A1}$ until it reaches the speed ratio increasing line $L_2$ (point E) that forms the right side of a parallelogram (third operating area $Z_1$). Thereafter, if the target throttle opening $\theta_{TH-T}$ is increased over $\theta_{THE}$, the target addition speed ratio $R_{A-T}$ is progressively increased along the speed ratio increasing line $L_2$ and reaches $R_{A2}$ (point F).

Next, consider the case where the target throttle opening $\theta_{TH-T}$ is progressively increased to $\theta_{THJ}$, from the state in which the target throttle opening $\theta_{TH-T}$ is $\theta_{THG}$ and the actual addition speed ratio $R_{A-A}$ is $R_{A2}$ (see point G in FIG. 4).

In this case, as indicated by an arrow $Y_6$, the target addition speed ratio $R_{A-T}$ remains at $R_{A2}$ until it reaches the speed ratio increasing line $L_2$ (point F). Thereafter, until the target throttle opening $\theta_{TH-T}$ reaches the fourth target opening $\theta_{TH-T4}$, the target addition speed ratio $R_{A-T}$ is progressively increased along the speed ratio increasing line $L_2$. Thereafter, until the target throttle opening $\theta_{TH-T}$ is increased from the fourth target opening $\theta_{TH-T4}$ to $\theta_{THJ}$, the target addition speed ratio $R_{A-T}$ is clipped at the maximum speed ratio $R_{A-max}$ (see the maximum clipping line $L_5$).

Next, consider the case where the target throttle opening $\theta_{TH-T}$ is progressively reduced to $\theta_{THF}$, from the state in which the target throttle opening $\theta_{TH-T}$ is $\theta_{THJ}$ and the actual addition speed ratio $R_{A-A}$ is $R_{A-max}$ (see point J).

In this case, even when the target throttle opening $\theta_{TH-T}$ is decreased under the fourth target opening $\theta_{TH-T4}$, the target addition speed ratio $R_{A-T}$ remains at $R_{A-max}$, as indicated by an arrow $Y_3$. This is because, only in the case where the target throttle opening $\theta_{TH-T}$ is increased over the speed ratio increasing line $L_2$, the target addition speed ratio $R_{A-T}$ is set along the speed ratio increasing line $L_2$ (see an arrow $Y_2$). Therefore, when the target throttle opening $\theta_{TH-T}$ is decreased under the speed ratio increasing line $L_2$ from $\theta_{TH-T4}$, the line $L_2$ has no influence on the setting of the target addition speed ratio $R_{A-T}$.

Thus, according to the CVT controller of the preferred embodiment of the present invention, the target addition speed ratio map 35 is provided with the third operating area $Z_1$, which is defined by the speed ratio decreasing line $L_4$, speed ratio increasing line $L_2$, maximum clipping line $L_5$, and minimum clipping line $L_6$. When an operating point, determined by the actual addition speed ratio $R_{A-A}$ and target throttle opening $\theta_{TH-T}$, is present within the third operating area $Z_1$, the target addition speed ratio $R_{A-T}$ is maintained at the actual addition speed ratio $R_{A-A}$. Consequently, with a simpler construction, the interference between the output control relative to the engine 11 and the speed ratio control relative to the CVT 12 can be prevented and, at the same time, the occurrence of a shock that is caused in changing vehicle speed can be suppressed.

The target addition speed ratio map 35 is also provided with the speed ratio decreasing line $L_4$. Therefore, if the target throttle opening $\theta_{TH-T}$ is decreased under the speed ratio decreasing line $L_4$, the target addition speed ratio $R_{A-T}$ can be progressively decreased. This can prevent the driving force of the vehicle 10 from becoming too great and enhance fuel consumption.

The target addition speed ratio map 35 is further provided with the speed ratio increasing line $L_2$. Therefore, if the target throttle opening $\theta_{TH-T}$ is increased over the speed ratio increasing line $L_2$, the target addition speed ratio $R_{A-T}$ can be progressively increased. This can prevent the driving force of the vehicle 10 from becoming too small. For instance, even when the vehicle 10 travels on an upward slope, the required driving force can be attained.

As shown in FIG. 3, the speed ratio decreasing line $L_4$ is set at an angle $\theta_1$ to the axis of the target throttle opening $\theta_{TH-T}$. Similarly, the speed ratio increasing line $L_2$ is set at an angle $\theta_2$ to the axis of the target throttle opening $\theta_{TH-T}$.

Therefore, setting the target addition speed ratio $R_{A-T}$ along the speed ratio decreasing line $L_4$ or speed ratio increasing line $L_2$ makes it possible to set the target addition speed ratio $R_{A-T}$ gentle. Therefore, when the vehicle speed $V_s$ is being held constant by the cruise control system 14, adjustments to the vehicle speed $V_s$ by adjustments to the target throttle opening $\theta_{TH-T}$ can have priority over the speed ratio control of the CVT 12. As a result, since a rapid increase in the target addition speed ratio $R_{A-T}$ can be prevented, suitable driving torque can be obtained, while avoiding a shock that is caused in changing vehicle speed.

The target addition speed ratio map 35 is provided with the minimum clipping line $L_6$ which, if the target throttle opening $\theta_{TH-T}$ is decreased under the first target opening $\theta_{TH-T1}$, makes the target addition speed ratio $R_{A-T}$ constant at the minimum speed ratio $R_{A-min}$. The target addition speed ratio map 35 is also provided with the maximum clipping line $L_5$ which, if the target throttle opening $\theta_{TH-T}$ is increased over the fourth target opening $\theta_{TH-T4}$, makes the target addition speed ratio $R_{A-T}$ constant at the maximum speed ratio $R_{A-max}$.

This makes it possible to provide simpler control for obtaining the target addition speed ratio $R_{A-T}$ while avoiding the occurrence of a shock which is caused in changing vehicle speed.

In addition, the minimum speed ratio $R_{A-min}$ is set to zero. Therefore, when the target addition speed ratio $R_{A-T}$ is the minimum speed ratio $R_{A-min}$, it is not necessary to add the target addition speed ratio $R_{A-T}$ to the basic speed ratio $R_B$. The target speed ratio $R_T$ can be obtained by the basic speed ratio $R_B$ alone, so that control for obtaining the target speed ratio $R_T$ can be made simpler.

While the present invention has been described with reference to the preferred embodiment thereof, the invention is not to be limited to the details given herein, but may be modified within the scope of the invention hereinafter claimed.

For example, in the preferred embodiment, while the target torque setting unit 21 is provided in the E/G-ECU 20, the present invention is not limited to this construction. The target torque setting unit 21 may be provided in the CVT-ECU 30.

In the preferred embodiment, while the throttle valve of the engine 11 is electronically controlled, the present invention is not limited to this construction.

In the preferred embodiment, the target torque interrelated value employs the target throttle opening $\theta_{TH-T}$. However, it may employ an accelerator pedal position. In the case of diesel engines, a fuel injection quantity may be employed.

The advantage of employing an accelerator pedal position as the target torque interrelated value is that the engine may be a gasoline engine or diesel engine. The advantage of employing a throttle opening as the target torque interrelated value is that a target torque for a gasoline engine can be accurately calculated. The advantage of employing a fuel injection quantity as the target torque interrelated value is that a target torque for a diesel engine can be accurately calculated.

In the preferred embodiment, while the target addition speed ratio setting unit 34 employs the target addition speed ratio map 35 to realize the aforementioned control, the present invention is not limited to this construction. For instance, a logic corresponding to the target addition speed ratio map 35 may be realized by a sequencer, etc.

In the preferred embodiment, although the angle $\theta_1$ of the speed ratio decreasing line $L_4$ relative to the axis of the target throttle opening $\theta_{TH-T}$ is equal to the angle $\theta_2$ of the speed ratio increasing line $L_2$ relative to the axis of the target throttle opening $\theta_{TH-T}$, the present invention is not limited to this arrangement.

For example, if the angles $\theta_1$ and $\theta_2$ are made smaller, speed ratios can be gently increased or decreased. On the other hand, if the angles $\theta_1$ and $\theta_2$ are made greater, speed ratios can be steeply increased or decreased. Therefore, the setting of the angle $\theta_1$ or $\theta_2$ makes it possible to perform fine adjustments to the drive feel.

If the angles $\theta_1$ and $\theta_2$ are set so that they differ from each other, a response to the accelerator pedal can be varied between deceleration and acceleration and therefore even finer adjustments to the drive feel are possible.

What is claimed is:

1. A controller for a continuously variable transmission mounted in a vehicle which has an engine and a cruise control system for maintaining a target vehicle speed, said controller comprising:

basic speed ratio setting means for setting a basic speed ratio of said continuously variable transmission based on said target vehicle speed;

adjustment speed ratio setting means for sequentially setting an adjustment speed ratio of said continuously variable transmission based on a target torque interrelated value which is a value interrelated with a target torque of said engine; and speed ratio control means for controlling said continuously variable transmission so that an actual speed ratio of said continuously variable transmission becomes equal to a target speed ratio obtained by adding said adjustment speed ratio set by said adjustment speed ratio setting means to said basic speed ratio set by said basic speed ratio setting means;

wherein said adjustment speed ratio setting means comprises adjustment speed ratio increasing means for progressively increasing said adjustment speed ratio according to an increase in said target torque interrelated value only when said target torque interrelated value is increased and when an operating point determined by said target torque interrelated value and adjustment speed ratio is present on a first operating area, and adjustment speed ratio decreasing means for progressively decreasing said adjustment speed ratio according to a decrease in said target torque interrelated value only when said target torque interrelated value is decreased and when said operating point is present on a second operating area;

and wherein, when said operating point is present within a third operating area between said first operating area and said second operating area, said adjustment speed ratio setting means maintains said adjustment speed ratio that is set finally.

2. The controller according to claim 1, wherein said adjustment speed ratio setting means sets a maximum value and a minimum value of said adjustment speed ratio.

3. The controller according to claim 2, wherein said adjustment speed ratio setting means includes an adjustment speed ratio map for setting said adjustment speed ratio based on said target torque interrelated value;

said first operating area is provided on an adjustment speed ratio increasing line which forms part of said adjustment speed ratio map;

said second operating area is provided on an adjustment speed ratio decreasing line which forms part of said adjustment speed ratio map;

if said target torque interrelated value is increased over said adjustment speed ratio increasing line, said adjustment speed ratio setting means sets said adjustment speed ratio along said adjustment speed ratio increasing line; and if said target torque interrelated value is decreased under said adjustment speed ratio decreasing line, said adjustment speed ratio setting means sets said adjustment speed ratio along said adjustment speed ratio decreasing line.

4. The controller according to claim 3, wherein said target torque interrelated value is expressed in accelerator pedal position.

5. The controller according to claim 3, wherein said target torque interrelated value is expressed in throttle opening.

6. The controller according to claim 3, wherein said target torque interrelated value is expressed in fuel injection quantity.

7. The controller according to claim 2, wherein said target torque interrelated value is expressed in accelerator pedal position.

8. The controller according to claim 2, wherein said target torque interrelated value is expressed in throttle opening.

9. The controller according to claim 2, wherein said target torque interrelated value is expressed in fuel injection quantity.

10. The controller according to claim 1, wherein said adjustment speed ratio setting means includes an adjustment speed ratio map for setting said adjustment speed ratio based on said target torque interrelated value;

said first operating area is provided on an adjustment speed ratio increasing line which forms part of said adjustment speed ratio map;

said second operating area is provided on an adjustment speed ratio decreasing line which forms part of said adjustment speed ratio map;

if said target torque interrelated value is increased over said adjustment speed ratio increasing line, said adjustment speed ratio setting means sets said adjustment speed ratio along said adjustment speed ratio increasing line; and if said target torque interrelated value is decreased under said adjustment speed ratio decreasing line, said adjustment speed ratio setting means sets said adjustment speed ratio along said adjustment speed ratio decreasing line.

11. The controller according to claim 10, wherein said target torque interrelated value is expressed in accelerator pedal position.

12. The controller according to claim 10, wherein said target torque interrelated value is expressed in throttle opening.

13. The controller according to claim 10, wherein said target torque interrelated value is expressed in fuel injection quantity.

14. The controller according to claim 1, wherein said target torque interrelated value is expressed in accelerator pedal position.

15. The controller according to claim 1, wherein said target torque interrelated value is expressed in throttle opening.

16. The controller according to claim 1, wherein said target torque interrelated value is expressed in fuel injection quantity.

* * * * *